(12) United States Patent  
Spanel et al.

(10) Patent No.: US 7,472,218 B2
(45) Date of Patent: Dec. 30, 2008

(54) ASSISTED TRACE FACILITY TO IMPROVE CPU CACHE PERFORMANCE

(75) Inventors: Carol Spanel, San Jose, CA (US); Andrew Dale Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 11/530,393

(22) Filed: Sep. 8, 2006

(65) Prior Publication Data

US 2008/0065810 A1    Mar. 13, 2008

(51) Int. Cl.
G06F 12/00 (2006.01)
(52) U.S. Cl. ........................................................ 711/3
(58) Field of Classification Search ................. None
See application file for complete search history.

(56) References Cited

U.S. PATENT DOCUMENTS 6,002,875 A * 12/1999 Stolberg ..................... 717/153
7,305,590 B2 * 12/2007 Miyamoto ................... 714/37
2006/0112310 A1 * 5/2006 McHale et al. .............. 714/15

* cited by examiner

Primary Examiner—Hiep T Nguyen
(74) Attorney, Agent, or Firm—Kunzler & McKenzie

(57) ABSTRACT

A system and method for recording trace data while conserving cache resources includes generating trace data and creating a cache line containing the trace data. The cache line is assigned a tag which corresponds to an intermediate address designated for processing the trace data. The cache line also contains embedded therein an actual address in memory for storing the trace data, which may include either a real address or a virtual address. The cache line may be received at the intermediate address and parsed to read the actual address. The trace data may then be written to a location in memory corresponding to the actual address. By routing trace data through a designated intermediate address, CPU cache may be conserved for other more important or more frequently accessed data.

7 Claims, 2 Drawing Sheets

ASSISTED TRACE FACILITY TO IMPROVE CPU CACHE PERFORMANCE

BACKGROUND OF THE INVENTION

1. Field of the Invention

This invention relates to apparatus and methods for recording trace data in computer systems and more particularly to apparatus and methods for conserving CPU cache resources when generating and recording trace data.

2. Description of the Related Art

Computer programs or other executables may be designed to generate and store trace data in computer memory or other storage devices. Trace data may include information about significant events that occur in the course of executing a computer program. For example, trace data may identify or include the content of memory addresses, instructions, registers, branches, exceptions, or other similar events occurring during program execution. This information is often helpful to debug or improve program code as well as to determine system behavior when a program is executing.

Although trace data is frequently written to memory, the data is typically not read unless an event such as an error occurs. Upon occurrence of an event, the trace data may be used to determine the state of the computing environment when the event occurred or what other events occurred either before or after the event of interest. Thus, trace data is updated often but seldom read. Furthermore, although the amount of trace data stored at any specific memory location is often small, trace data is often stored at many different locations in memory.

In certain situations, hardware may be used to provide a fixed number of buffers or other mechanisms for storing trace data. Each time an event occurs, trace data corresponding to the event may simply be added to previously gathered trace data in the buffer. This trace data may be periodically flushed from the buffer or other storage mechanism to a long-term storage device.

Nevertheless, a fixed number of hardware buffers may be limiting in its ability to store and process trace data. Furthermore, providing additional buffers is expensive and is not necessarily an effective way to process trace data. For example, some software may include control structures of a few hundred to a few thousand bytes in length. In a storage system or communication system, there may be thousands of these structures, and hundreds or even thousands may be active concurrently. Each structure may generate some trace or other data which is almost never read.

The trace data generated by these structures has the undesirable effect of filling the L1, L2, or even L3 cache with data that is unlikely to be read. This data must normally age out like other data in the cache. The consequence is lower L1 and L2 hit ratios and substantially reduced processor performance. Furthermore, performing these writes with cache-inhibited mechanisms is also unacceptable because standard microprocessors will perform such operations one word at a time on the external bus, thereby increasing system overhead significantly.

In view of the foregoing, what are needed are improved apparatus and methods for recording trace data in computer systems. Specifically, apparatus and methods are needed for conserving the resources of a CPU's cache when generating and recording trace data.

SUMMARY OF THE INVENTION

The present invention has been developed in response to the present state of the art, and in particular, in response to the problems and needs in the art that have not yet been fully solved by currently available systems and methods. Accordingly, the present invention has been developed to provide improved systems and methods for conserving CPU cache resources when generating and recording trace data.

In one embodiment, a method in accordance with the invention includes generating trace data and creating a cache line containing the trace data. The cache line is assigned a tag which corresponds to an intermediate address designated for processing the trace data. The cache line also contains embedded therein an actual address in memory for storing the trace data, which may include either a real address or a virtual address. The cache line may be received at the intermediate address and parsed to read the actual address. The trace data may then be written to a location in memory corresponding to the actual address. By routing trace data through a designated intermediate address, CPU cache may be conserved for other more important or more frequently accessed data.

In another aspect of the invention, a system for conserving CPU cache resources when generating and recording trace data includes a CPU that generates trace data upon executing a program. A cache is provided to store a cache line containing the trace data. A tag is associated with the cache line and identifies an intermediate address designated for processing the trace data. An actual address is embedded in the cache line which corresponds to an actual location in memory to store the trace data. A storage assist module is provided to receive the cache line addressed to the intermediate address, parse the cache line to read the actual address, and write the trace data to the location in memory corresponding to the actual address.

The present invention provides novel systems and methods for conserving CPU cache resources when generating and recording trace data. The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through the use of the accompanying drawings, in which.

DETAILED DESCRIPTION OF THE INVENTION

Figure 1:
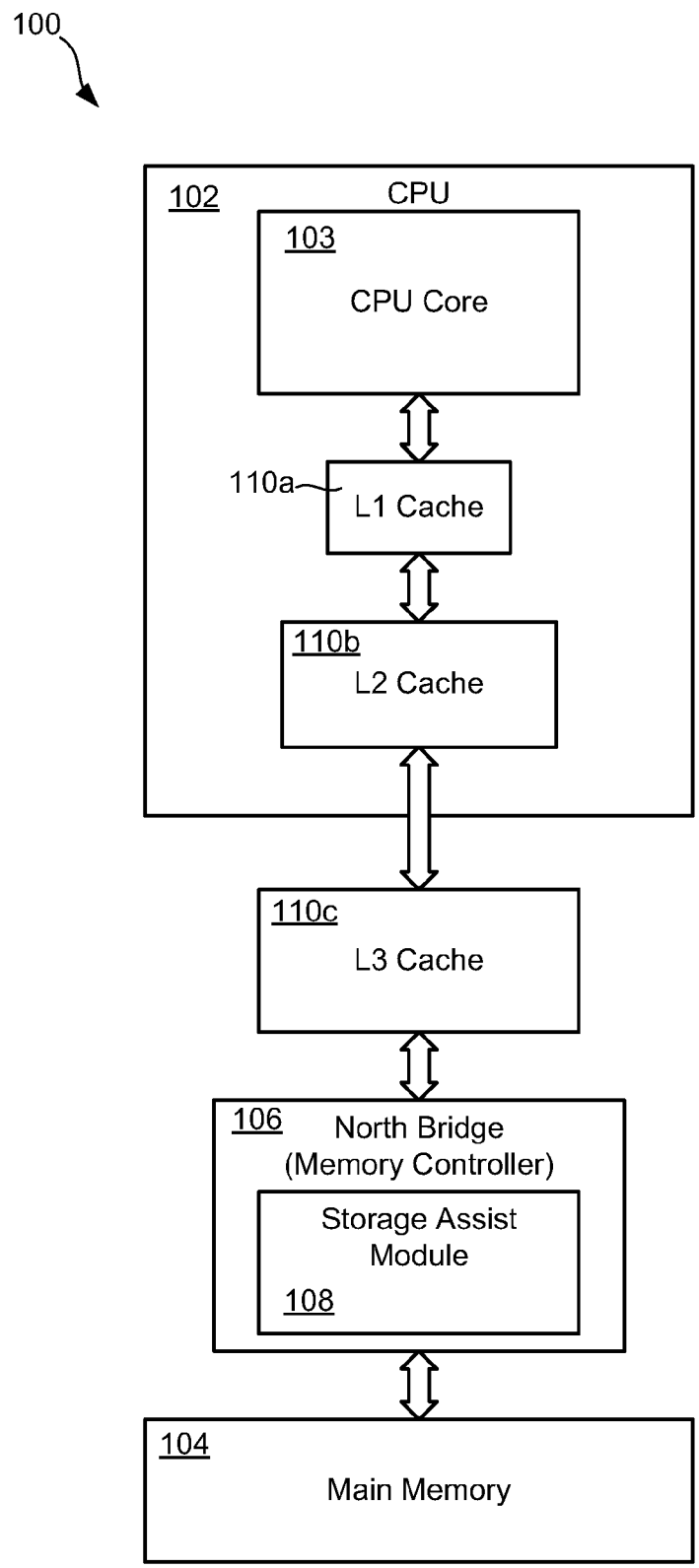
FIG. 1 is a high-level block diagram illustrating a system comprising a storage assist module in accordance with the invention.

It will be readily understood that the components of the present invention, as generally described and illustrated in the Figures herein, may be arranged and designed in a wide variety of different configurations. Thus, the following more detailed description of the embodiments of the systems and methods of the present invention, as represented in the Figures, is not intended to limit the scope of the invention, as claimed, but is merely representative of selected embodiments of the invention.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

Referring to FIG. 1, in general, a system 100 to conserve cache resources when generating and recording trace data may include a CPU 102 comprising a core 103, main memory 104, and a memory controller 106 comprising a storage assist module 108 in accordance with the invention. One or more levels of cache 110a-c may be provided to reduce the average time required by the CPU 102 to access memory 104. Some levels of cache 110a, 110b may be built into the CPU 102 while others 110c may be located external to the CPU 102, such as on a motherboard. The cache 110 may be used to store copies of data and instructions from the most frequently or recently accessed locations in main memory 104.

As previously mentioned, trace data generated by program code may have the undesirable effect of filling a significant portion of the L1, L2, or even L3 cache 110. To reduce the negative effects of trace data in the cache 110, a storage assist module 108 may be provided to aid in logging trace data while preventing it from filling the cache 110. As will be explained in more detail hereafter, the storage assist module 108 may conserve space in the cache 110 by routing trace data to one or more specific memory addresses. In selected embodiments, the storage assist module 108 may be provided in the north bridge, where a memory controller 106 is frequently implemented. In other embodiments, the memory controller 106 and the storage assist module 108 may be integrated into the CPU 102. Nevertheless, the location and configuration of the storage assist module 108 may be varied based on the architecture of the CPU 102, motherboard, memory 104, and the like, to provide the functions described herein.

Figure 2:
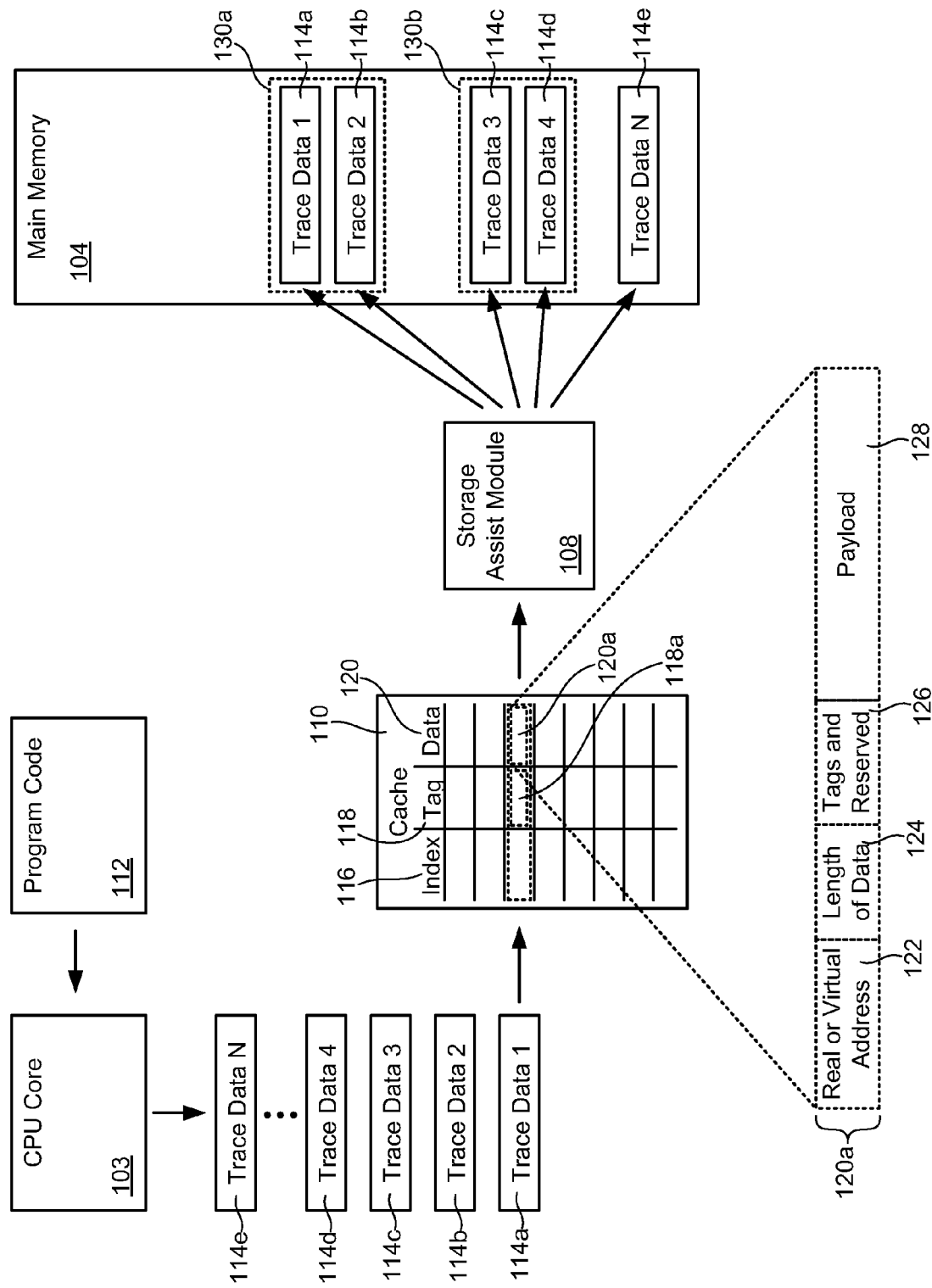
FIG. 2 is a high-level flow diagram showing one embodiment of a method of operation of a storage assist module in accordance with the invention.

Referring to FIG. 2, upon executing program code 112, a CPU core 103 may generate a significant amount of trace data 114a-e. As previously mentioned, this trace data 114a-e may be generated by various control structures in software. There may be thousands of these structures, of which hundreds or even thousands may be active concurrently. Each of these structures may generate some trace data 114a-e.

To reduce the effects of trace data on the cache 110, all or a significant portion of the trace data 114a-e may be routed to a specific memory address in cacheable space. In general, a cache 110 may be characterized by an index 116, a tag 118, and a datum 120 or cache line 120. The index 116 may contain the location of the cache line 120 in the cache 110 while the tag 118 contains the index (i.e., address) of the cache line 110 in main memory 104. By repeatedly routing trace data 114 to the same address in main memory, only a single tag 118a and thus a single cache line 120a in the cache 110 is used to store trace data 114. This differs from prior apparatus and methods in that it does not continue to fill up the cache 110 as new trace data is received.

When trace data is written to the cache line 120a, or previous trace data is flushed from the cache 110 to the specified memory address, this may trigger operation of the storage assist module 108. In certain embodiments, the cache line 120a is flushed from the cache 110 to the storage assist module 108 each time the cache line 120a is updated. In the event the cache line 120a ages out of the cache 110, the cache line 120a may also be routed to the storage assist module 108. In either case, the storage assist module 108 receives the cache line 120a, extracts the trace data, and directs the trace data to the appropriate address in main memory 104.

In certain embodiments, various types of data may be embedded in the cache line 120a to facilitate processing by the storage assist module 108. For example, a cache line 120a may include a real or virtual address 122 identifying an actual location in main memory 104 to store the trace data. This area 122 may identify an absolute address in memory or, alternatively, an address that is subject to address translation (i.e., virtual memory). The cache line 120a may also include a length indicator 124 enabling the storage assist module 108 to extract a certain number of bytes from the cache line 120a and discard the rest. The cache line 120a may also include various tags or reserved indicators 126 to provide information such as whether the cache line should be padded to a full cache line or not. Likewise, the data payload 128 may be used to carry the trace data.

For a cache line of 128 bytes, a cache line 120a may, for example, reserve eight bytes for the address 122, one byte for the length 124, three bytes for the tags and reserved indicators 126, and the remainder, in this case 116 bytes, for the payload 128. These divisions may be adjusted, as needed, and may be varied based on the length of the cache line 120a, which may range in size from 8 to 512 bytes.

Upon receiving the cache line 120a, the storage assist module 108 may parse the cache line 120a to extract each of the pieces of data 122, 124, 126, 128. This data may then be used to direct the trace data 114 to the appropriate locations in memory 104. Some trace data 114a-d, for example, may be stored in blocks 130a, 130b of contiguous memory locations, while other data 114e may be directed to isolated locations in memory 104.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for conserving CPU cache resources when generating and recording trace data, the method comprising:
    generating trace data;
    creating a cache line containing the trace data;
    assigning a tag to the cache line comprising an intermediate address designated for processing the trace data;
    embedding within the cache line an actual address in memory for storing the trace data;
    receiving the cache line at the intermediate address;
    parsing the cache line to read the actual address; and
    writing the trace data to a location in memory corresponding to the actual address.

2. The method of claim 1, wherein the actual address is selected from the group consisting of a real address and a virtual address.

3. The method of claim 1, further comprising embedding within the cache line at least one of the length of the trace data within the cache line and a tag indicating whether the cache line should be padded to a full cache line.

4. A system for conserving CPU cache resources when generating and recording trace data, the system comprising:
    a CPU to generate trace data upon executing a program;
    a cache to store a cache line containing the trace data, the cache line having associated therewith a tag corresponding to an intermediate address designated for processing the trace data, the cache line further having embedded therein an actual address in memory to store the trace data; and
    a storage assist module to receive the cache line at the intermediate address, parse the cache line to read the actual address, and write the trace data to a location in memory corresponding to the actual address.

5. The system of claim 4, wherein the actual address is selected from the group consisting of a real address and a virtual address.

6. The system of claim 4, wherein the cache line further has embedded therein at least one of the length of the trace data within the cache line and a tag indicating whether the cache line should be padded to a full cache line.

7. The system of claim 4, wherein the cache comprises at least one of an L1, L2, and L3 cache.

* * * * *